(12) United States Patent
Gerber

(10) Patent No.: US 8,600,953 B1
(45) Date of Patent: Dec. 3, 2013

(54) VERIFICATION OF METADATA INTEGRITY FOR INODE-BASED BACKUPS

(75) Inventor: Clyde Delton Gerber, Mendota Heights, MN (US)

(73) Assignee: Symantec Corporation, Cupertino, CA (US)

( * ) Notice: Subject to any disclaimer, the term of this patent is extended or adjusted under 35 U.S.C. 154(b) by 1537 days.

(21) Appl. No.: 11/760,501

(22) Filed: Jun. 8, 2007

(51) Int. Cl.
*G06F 17/30* (2006.01)

(52) U.S. Cl.
USPC .......................................... 707/687; 711/162

(58) Field of Classification Search
None
See application file for complete search history.

(56) References Cited

U.S. PATENT DOCUMENTS

| | | | |
|---|---|---|---|
| 5,740,434 A | 4/1998 | Eastep | |
| 5,875,444 A | 2/1999 | Hughes | |
| 6,496,944 B1 | 12/2002 | Hsiao et al. | |
| 7,089,293 B2 | 8/2006 | Grosner et al. | |
| 7,092,976 B2 | 8/2006 | Curran et al. | |
| 7,317,175 B2 | 1/2008 | Irwin et al. | |
| 7,391,784 B1 * | 6/2008 | Renkel | 370/401 |
| 2004/0054697 A1 * | 3/2004 | Tsaur et al. | 707/204 |
| 2004/0268068 A1 | 12/2004 | Curran et al. | |
| 2005/0289152 A1 | 12/2005 | Earl et al. | |
| 2006/0248294 A1 | 11/2006 | Nedved et al. | |
| 2007/0067256 A1 * | 3/2007 | Zayas et al. | 707/1 |
| 2007/0260728 A1 * | 11/2007 | Noble | 709/224 |
| 2008/0189343 A1 * | 8/2008 | Hyer et al. | 707/205 |

FOREIGN PATENT DOCUMENTS

| | | |
|---|---|---|
| EP | 817102 | 1/1998 |
| EP | 1112537 | 7/2001 |

* cited by examiner

*Primary Examiner* — Yuk Ting Choi
(74) *Attorney, Agent, or Firm* — Meyertons, Hood, Kivlin, Kowert & Goetzel, P.C.; Paul T. Seegers; Dean M. Munyon (57) ABSTRACT

Systems, methods, and computer-readable memory media for performing various methods for verification of inode metadata are disclosed. This may be done, in various embodiments, by splitting the metadata for a given inode into two or more components. Each component may then be transmitted as an inode message from, for example, a data server to a backup server. Counters may be used to determine if all messages have been received for a group of inodes. Temporary data structures may be created dynamically to aid in the verification of the inode metadata. In one embodiment, received inode metadata is used to indicate the presence (e.g., in a catalog) of an invalid reference from a child inode to its parent inode. A metadata catalog may be created and used during the restore process to "browse" a portion of the backed up data.

13 Claims, 8 Drawing Sheets

VERIFICATION OF METADATA INTEGRITY FOR INODE-BASED BACKUPS

BACKGROUND OF THE INVENTION

1. Field of the Invention

This disclosure relates generally to processing of information within computer systems, and more particularly to backing up data present on computer systems.

2. Description of the Related Art

One common backup technique in use today is an "inode"-based backup. Standard backups and inode-based backups differ in the way that they send backup metadata (data describing the actual data to be backed up) from the location of the data to be backed up (e.g., "source" computer system) to the location where the backed up data is stored. In standard backup techniques, the data to be backed up that is present on the source computer system is sent as a stream to the backup location. In inode-based backups, the metadata is transmitted from the source computer system to the backup location in the form of "inode messages." In some instances, a given inode may have two or more messages, each including different types of metadata. Upon receipt at the backup location, the various inode messages are processed to obtain the metadata. The received metadata may be assembled into a "catalog" to aid in the restoration process.

When inode metadata is sent in two (or more) parts, data integrity issues may be introduced if only one part of the metadata is received by the backup location. The fact that metadata is missing may go unnoticed until an attempt to browse the catalog is made—usually as part of an attempt to restore data from the backup location. Such discrepancies in the metadata can be extremely costly.

An improved method for performing inode-based backups is therefore desired.

SUMMARY

Various embodiments for performing verification of inode metadata are disclosed. In one embodiment, a plurality of messages including inode metadata are received (e.g., at a backup server), where the inode metadata is for one of a plurality of inodes that is being backed up. In one embodiment, such messages may be received via a Network Data Management Protocol (NDMP). The received plurality of inode messages may then be used to verify the integrity of the received inode metadata.

In some embodiments, there are two types of inode messages for a given inode. For example, there might be a first inode message type that includes name and parent information for the given inode, while a second inode message type includes additional metadata for the given inode. In one embodiment of inode metadata verification, it is determined whether, excluding duplicate messages, an equal number of messages of the first type and messages of the second type have been received. In another embodiment, it may be determined, for each of the plurality of inodes, whether the received plurality of inode messages includes at least one message of the first type and at least one message of the second type. In still another embodiment, a backup catalog (e.g., a directory portion) may be traversed in order to determine whether metadata associated with each of the directories listed in the catalog includes a valid reference to a parent directory.

Various embodiments include systems, methods, and computer-readable media for performing techniques disclosed herein.

DETAILED DESCRIPTION

As used herein, a "file system" is a collection of files that, when set into a logical hierarchy, make up an organized, structured set of information. There are many different types of file systems. File systems may be mounted from a local system or remote system. File system software may include system or application-level software that may be used to create, manage, and access file systems. Different operating systems may utilize different file systems.

A file system maintains "metadata" for files or other objects (e.g., directories) that are part of the file system. As opposed to data within a file system object itself (e.g., the data in a file), file system metadata is information that is about or describes a file system object. For example, file system metadata may include definitions and descriptions of a file that it references. File name, folder name, and file size are all (non-limiting) examples of types of file system metadata.

File systems may use data structures known as "inodes" to store file metadata. As used herein, an inode is a data structure capable of storing information about file system objects (e.g., files and directories). Typically, there is an inode for each file system object. Each file system object may be uniquely identified within the file system by an inode number, which may be an entry in an inode data structure.

Figure 1:
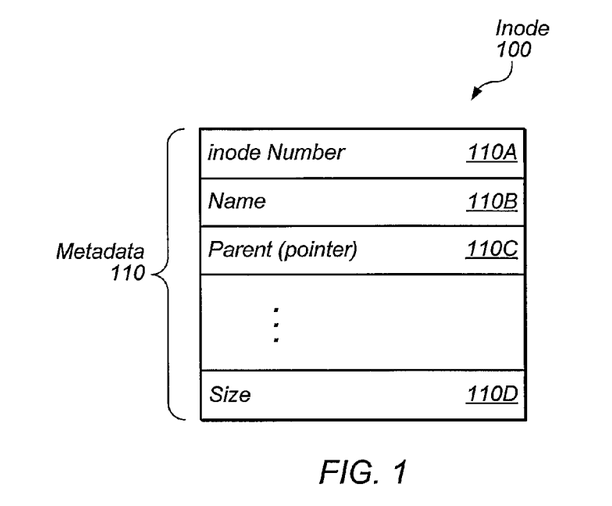
FIG. 1 depicts one embodiment of an inode data structure.

Turning now to FIG. 1, a block diagram of one embodiment of an inode is illustrated. As shown, inode 100 includes a collection of metadata 110, which includes specific metadata fields 110A-D. In one embodiment, field 110A stores an inode number or other identifying information, unique or otherwise; field 110B stores the name of the file system object corresponding to the inode; field 110C includes a pointer to the parent inode of the inode; and field 110D stores the size of the file system object (e.g., in bytes). Many other possible combinations of metadata types are possible. For example, metadata fields 110 can also store: the device where the inode resides, path information for the file system object as seen from the application side and corresponding file system location information (e.g. device-block number(s)), locking information, mode and type of the file system object, the number of links to the file system object, owner's user and group identifiers for the file system object, access rights to the file system object, time the file system object was created, last access and modification times, the time the inode itself was last modified, etc. Metadata can also include pointers to data. For example, a metadata field for a given inode might include a pointer to a location in memory that stores some number of consecutive bytes of data for the file system object corresponding to the given inode. (Pointers can also point to data indirectly as well.) Various other types of inode metadata are possible.

Figure 2:
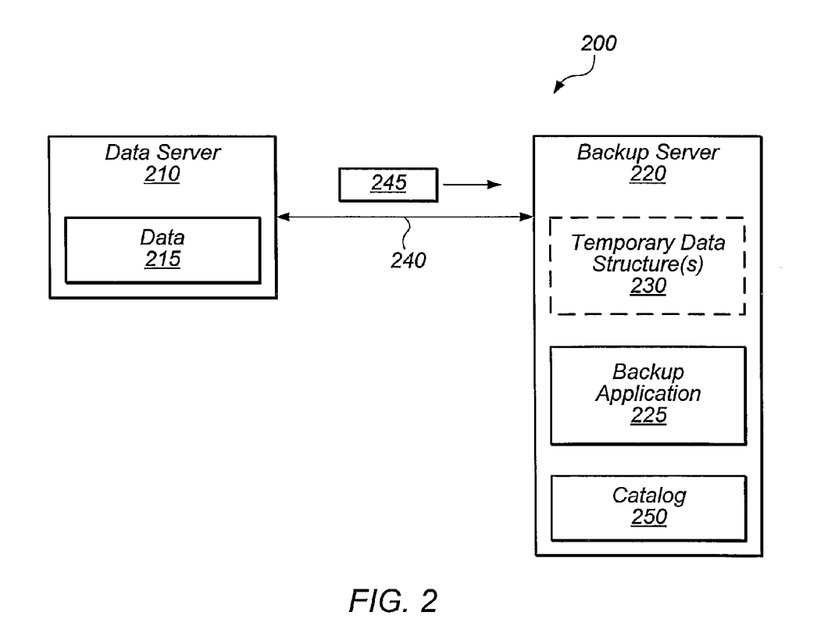
FIG. 2 is a block diagram of one embodiment of a system for performing verification of inode metadata.

Turning now to FIG. 2, a block diagram of one embodiment of a system for performing verification of inode metadata is shown. As shown, system 200 includes a data server 210 that hosts a storage medium containing data 215 to be backed up. In the embodiment shown in FIG. 2, data 215 includes metadata about the data to be backed up. System 200 also includes a backup server 220 that in one embodiment stores program instructions and data usable to implement backup application 225 responsible for making backups of data 215. (In one embodiment, backup application 225 also includes a component or module located on data server 210.) Backup server 220 is shown as coupled to data server 210 via a connection 240 that allows data communication between them. Connection 240 can be via any suitable means (e.g., direct cabling, local area network (LAN) or wide area network (WAN), wired, wireless, public network, private network, or any combination thereof).

Backup server 220 can be any suitable computer system, which may include one or more computers. In one embodiment, backup server 220 includes a processor unit having one or more processors, which may be located on a single physical computer or distributed across two or more computers. In this embodiment, backup server 220 also includes a memory subsystem that includes both volatile and nonvolatile storage. The memory subsystem, which may also be located on a single physical computer or distributed across two or more computers, is capable of storing program instructions and/or data to accomplish various operations, including those relating to storing backup data received over connection 240.

In one embodiment, the connection between data server 210 and backup server 220 over connection 240 uses the Network Data Management Protocol (NDMP). NDMP is an open network protocol that defines standards used for the data flows involved in backup processes. With NDMP, vendors use common interfaces for common architecture for data and metadata flow. Data need not be transferred using NDMP, however.

In system 200, inode metadata is backed up by first splitting the metadata for each inode into two or more components. Each component may then be transmitted as an inode message (e.g., 245) from data server 210 to backup server 220 via connection 240. In one embodiment, temporary data structures 230 are created by backup application 225 based on the received inode metadata. Data structures 230 may then be used to perform verification of inode metadata using methods such as those described below. In one embodiment, backup application 225 creates a metadata catalog 250 on backup server 220. Catalog 250 may be used during the restore process to "browse" the backed up data.

There is no assurance that a given transmitted inode message 245 will reach backup server 220. Thus, there is a probability that backup server 220 will not receive all the metadata for all the inodes relating to the metadata in data 215. For example, not all of the messages for a given inode may be received by backup server 220.

Figure 2A:
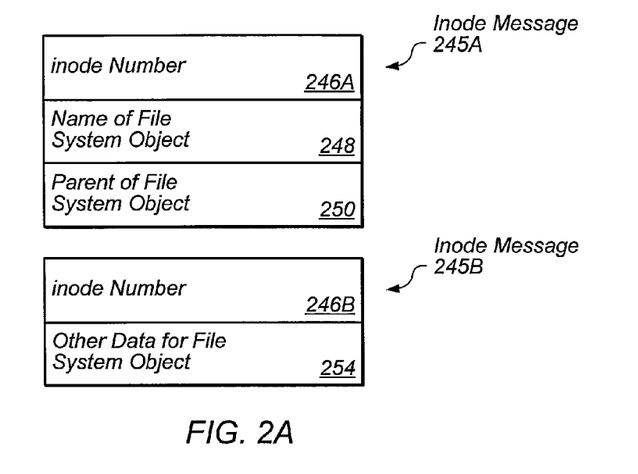
FIG. 2A depicts an example of two inode messages for a given inode.

Turning next to FIG. 2A, two example inode messages are depicted. In the example shown in FIG. 2A, inode messages 245A and 245B may be considered to be different "types" of messages. Here, message 245A is of a type that includes, in addition to a field storing the inode number 246A (or other identifying information), a field storing the name of the file system object to which the inode corresponds (248) and a field indicative of the parent of the file system object (250). Field 250 may be pointer to another inode, and may also be empty (e.g., if the file system object does not have a parent). Conversely, message 245B is of a type that includes, in addition to inode number 246B (or other identifying information), other information about the file system object (shown collectively as 254). In certain embodiments, all of the inode messages 245 for a given inode store a common identifier (e.g., inode number). In other embodiments, this may not be the case. For example, in one embodiment, all of the messages for a given inode might be transmitted at substantially the same time, so that the receiver of the message could determine that different messages are for the same inode based on their proximity.

Although FIG. 2A depicts two types of inode messages, certain embodiments may have an arbitrary number of inode message types for a given inode. For example, in one embodiment, three inode message types might exist. A first message type might be analogous to the type of message 245A, while the second and third message types might store different types of additional data about the corresponding file system object.

Figure 3:
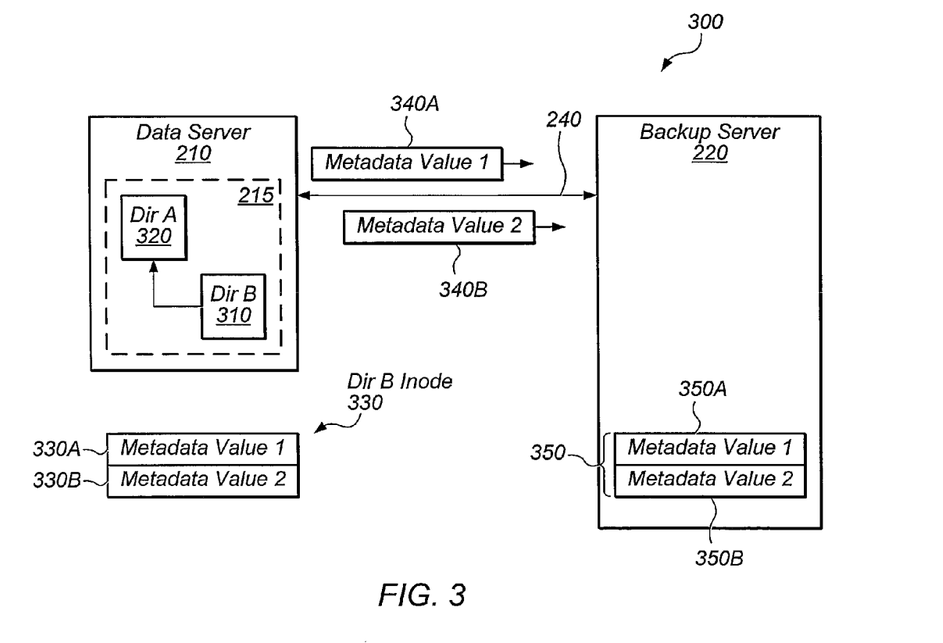
FIG. 3 is a block diagram of one embodiment of a data backup system.

Turning now to FIG. 3, a block diagram of one embodiment of a data backup system is illustrated. Elements from FIG. 2 are numbered identically for convenience. System 300 illustrates an inode-based backup using as an example inode 330 corresponding to the file system object 310, which in this example is a "directory B" whose parent directory is a "directory A".

As shown, data server 210 hosts a portion of data 215 that is to be backed up. Data 215 includes file system objects 310 (which represents a directory B) and 320 (which represent the parent directory of directory B-directory A). Metadata corresponding to directory B is stored in inode 330, and contains first and second metadata values 330A-B. Metadata values 1 and 2 may, in one embodiment, correspond to values for fields 110A-B (in an instance in which inode 330 corresponded to a data structure such as the one shown in FIG. 1, for example). As shown, inode 330 may be split into multiple messages—here, 340A and 340B, corresponding to metadata values 330A and 330B respectively. In one embodiment, message 340A may include a reference to the parent of B, which is directory A. For example, if inode 330 has a data structure such as that shown in FIG. 1, message 340A might include metadata field 110C, which can store a pointer to the parent directory ("A") of directory B.

Suppose that inode metadata 330A is sent to backup server 220 as inode message 340A, and metadata 330B is independently sent to server 220 as inode message 340B. Both of these messages may be received, albeit at different times (as represented by the staggering of messages 340 in FIG. 3 on connection 240), at backup server 220. The received messages allow the original metadata 330 corresponding to directory B to be reconstructed. The reconstructed metadata may be added, for example, to catalog 350 maintained at backup server 220. Entries 350A-B in catalog 350 may correspond to metadata values 330A-B in one embodiment.

System 200 does not guarantee any sequence in which messages 330 are received at server 220 or whether the messages are received at all. Thus, backup server 220 might receive message 340B well before it receives message 340A.

Alternately, one or both of messages 340 could be lost in transmission. If, for example, message 340A is received at backup server 220 but message 340B is not, the metadata for inode 330 would be incomplete in catalog 350 on backup server 220. Still further, using the data structure of inode 100, if either of messages 340 for directory B are lost in transmission and directory B has one or more "child" directories, the metadata for the child directories will contain an invalid reference to parent directory B in the catalog on backup server 220. Methods addressing such a problem are described below, e.g., in relation to FIGS. 6A, 6B, 7A, and 7B. Similarly, if messages 340A and 340B are never received at backup server 220, there would be no metadata corresponding to inode 330 in the catalog on backup server 220. This problem is addressed below, e.g., in relation to FIGS. 8A and 8B.

As stated above, although several examples have just been described in which an inode is divided into two component messages, in other embodiments, inode metadata may be sent as three or more different component messages. Techniques described below are applicable to such embodiments.

Figure 4:
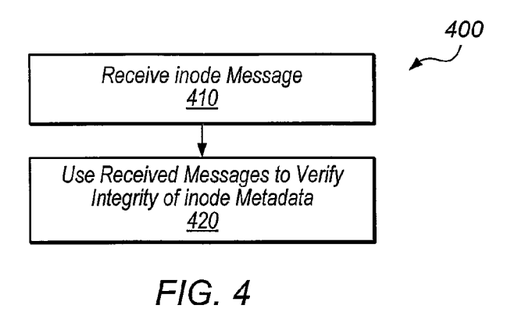
FIG. 4 is a flowchart of one embodiment of a method for performing verification of inode metadata.

Turning now to FIG. 4, a flowchart of a method 400 is illustrated. Method 400 is one embodiment of a method for performing data verification during a backup process. In step 410, one or more inode messages are received. These messages may be received from any suitable location, including various portions of a distributed storage architecture. In one embodiment, these messages are received at a backup server (e.g., 220), although in other embodiments, the messages may be received at an intermediate server or other location. As used in the context of method 400, "inode message" refers to data that includes a portion of the metadata for a corresponding inode for some file system to be backed up. The message may be transmitted in any suitable way over connection 240, including being encapsulation and/or packetization as part of a communication protocol (e.g., TCP/IP, etc.). As discussed previously, these messages may not be received in the same sequence in which they were transmitted, and also some messages might be lost in transmission and never received at backup server 220.

In step 420, the received inode messages are used to verify the integrity of the metadata. Step 40 can thus be used to increase the likelihood that the backup process includes all the necessary data. Note that, in some embodiments, method 400 can proceed to step 420 only after all inode messages are received in step 410, while in other embodiments, step 420 is performed after some inode messages are received, with the method looping from step 420 back to step 410 until complete. As described below, the received inode messages may be used to update a catalog usable in the restore process. Various embodiments of method 400 are possible, and several are described further below.

Figure 5:
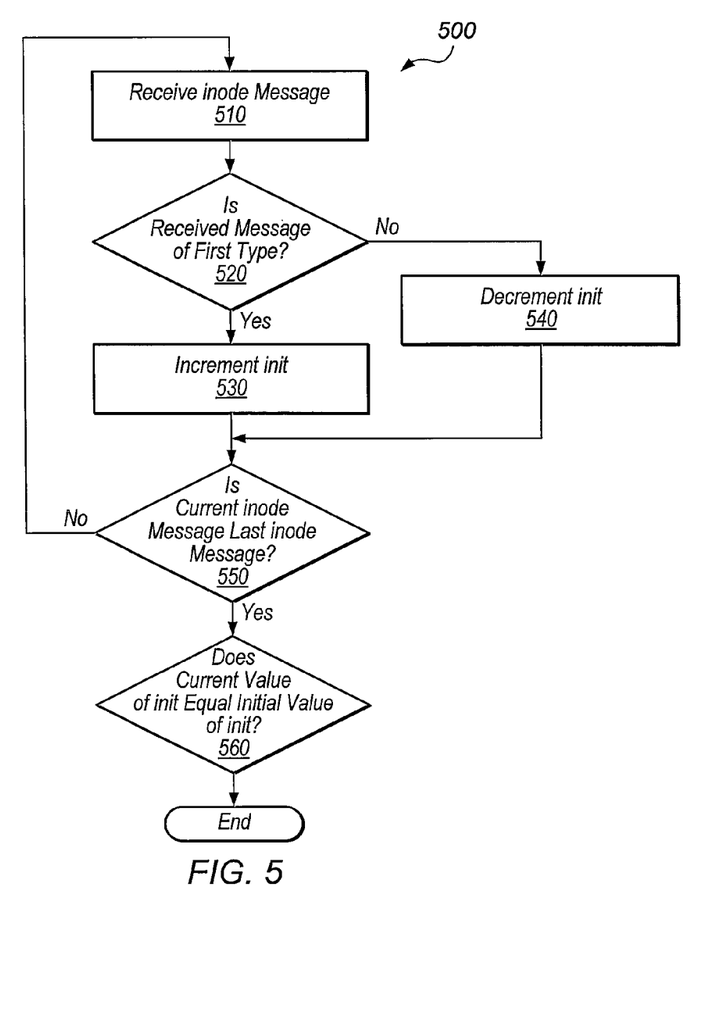
FIG. 5 is a flowchart of one embodiment of a method that uses a counter for performing verification of inode metadata.

Turning now to FIG. 5, a flowchart of a method 500 is illustrated. Method 500 is one embodiment of a method for performing verification of inode metadata. In this embodiment, there are two types of inodes message for a given inode (e.g., a first type of message that includes inode name and parent, and a second message type with remaining metadata.) Method 500 can also be modified for use with embodiments with more than two message types for a given inode.

As method 500 commences, a counter value (e.g., in a variable in a program) is set to or has some initial value (this value is referred to as "init" in FIG. 5). In step 510, an inode message is received (e.g., at backup server 220). In step 520, a determination is made whether the received message is of the first type. If so, the counter value init is incremented in step 530; otherwise, the counter value init is decremented in step 540. Method 500 then proceeds to step 550. Note that in an alternate embodiment, the counter value init is decremented in step 530 and incremented in step 540.

In step 550, a determination is made whether the current inode message is the last inode message. If not, the message returns to step 510 to receive the next inode message and method 500 continues. There are many different ways that method 500 can determine that all inode messages have been received. For example, method 500 can loop until an interrupt is received indicating that all messages are received.

In step 560, a determination is made whether the current value of the counter init is equal to its initial value (e.g., zero). If so, method 500 either ends or further verification is performed in step 570. (For example, further analysis of the received inode metadata may be performed using other techniques.) If the current value of init is not equal to its initial value, step 566 reports an error, allowing appropriate action to be taken. In sum, method 500 is usable to detect whether an equal number of different message types are received.

It is common for a file system to include multiple references to a single file system object. Such a situation may arise, for example, in the case when a file system has so-called "hard links." A "hard link" allows a given file system object to be referenced by more than one name. (For example, directory A may include file X, and directory B may include Y, which is actually a reference to file X.) (A "soft link," in contrast, may be a special file that contains a pathname to a file, etc. it is aliased to.) Thus, in some embodiments, multiple inode messages that include name and parent information may be received for a given inode (e.g., one for each reference to a particular inode). (In some embodiments, the data message for the "hard linked" file system object need be sent only once.) In such situations, it may be desirable to utilize a variation of method 500 that accounts for the presence of hard links.

Figure 6:
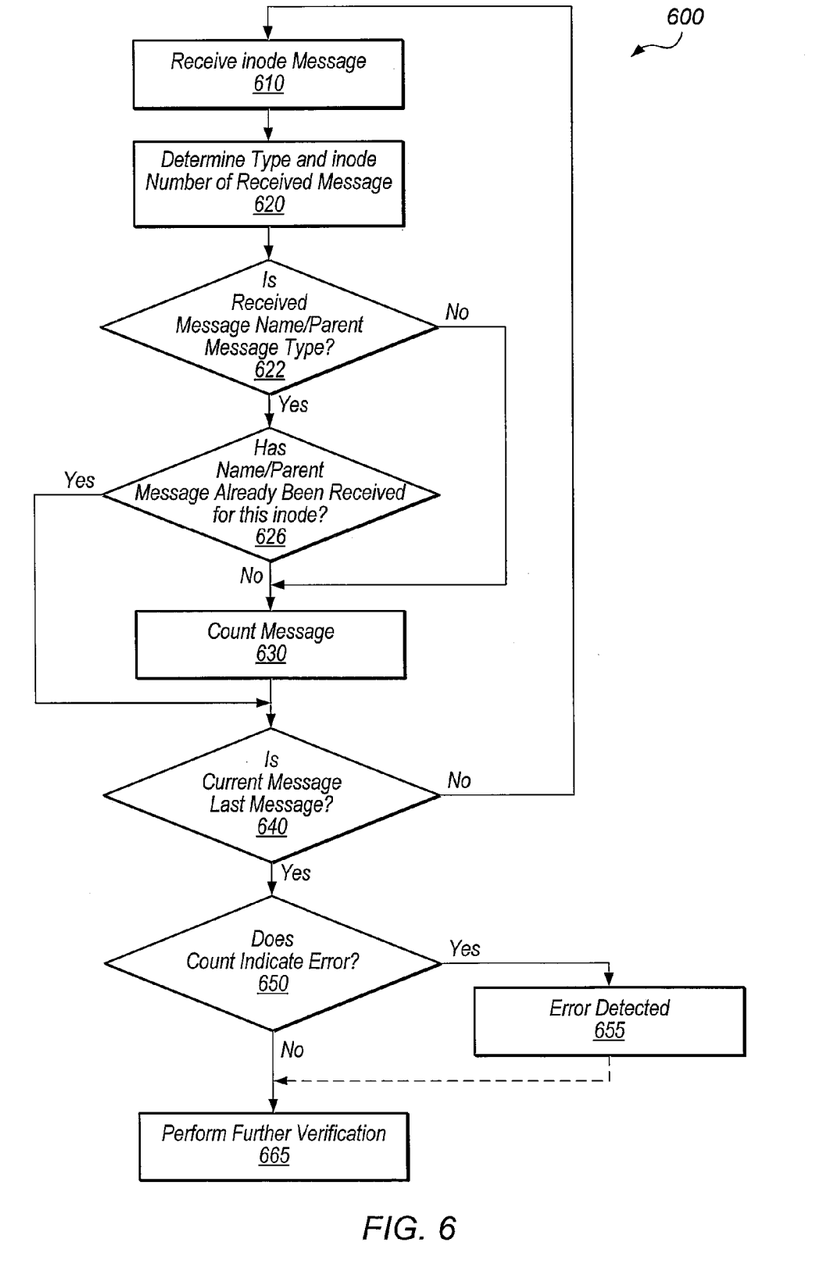
FIG. 6 is a flowchart of one embodiment of a method for performing verification of inode metadata for a file system that includes duplicate file system objects.

Turning now to FIG. 6, a flowchart of a method 600 is illustrated. Method 600 is one embodiment of a method for performing verification of inode metadata. Method 600 is a variation of method 500 that explicitly accounts for the presence of file system objects such as hard links. Method 600 is described with reference to an embodiment that includes two inode message types: a "name/parent" message and a "data" message. Other message types are also possible.

In step 610, an inode message is received (e.g., at backup server 220). The inode message may be either a name/parent message or a data message. In step 620, the type and inode number (or other identifying information) for the message is determined. In step 622, a determination is made whether the received message is a name/parent message type. If not, the message is "counted" at step 630. If the message is a name/parent message type, a determination is made at step 626 whether a name/parent message type has already been received for this inode. If not, method 600 proceeds to step 630. If, however, the message is a name/parent-type message and such a message has already been received for this inode, the message is not "counted," and method 600 continues to step 640. In this manner, only the first name/parent message for a given inode is counted, thus allowing "duplicate" file system objects such as hard links to be ignored.

In step 630, a message type count is maintained. The count may be performed in several different ways. For example, a counter for each respective message type may be incremented upon receipt of each non-duplicative message. Alternatively, as opposed to using different counters for each message type, a single counter may be incremented for each received name/parent message, and decremented for each data message (or vice-versa).

After the current message is processed, a determination is made in step 640 whether the current message is the last message. If not, the method returns to step 610. If so, method 600 continues with step 650. As noted above, the detection of the "last message" condition may be performed in many different ways.

In step 650, a comparison is made between the number of messages of first type and the number of messages of second type. Step 650 may be performed differently depending upon how step 630 is performed. For example, if a different counter is used for each message type, a comparison between the name/parent message counter and the data message counter may be made to determine if the two values are equal. If, however, a single counter is used, a determination may be made whether the counter is equal to initial value before the commencement of method 600. For example, if a single counter is originally set to zero, and is incremented (or decremented) for each non-duplicative name/parent message and decremented (incremented) for each data message, step 650 may be performed by determining if the counter is equal to zero. The result of step 650 is a determination of whether the count value indicates an error (e.g., there is at least one inode for which there is incomplete metadata). Note that method 600 does not detect all possible metadata integrity errors.

If the maintained count value indicates an error, method 600 detects a metadata integrity error in step 655. At step 655, this error may be indicated in any of various possible ways. Method 600 may either conclude at step 655, or proceed to step 665. If, on the other hand, step 650 does not indicate an error, method 600 proceeds to step 665. At this point, method 600 may conclude or further metadata analysis may be performed.

Figure 7A:
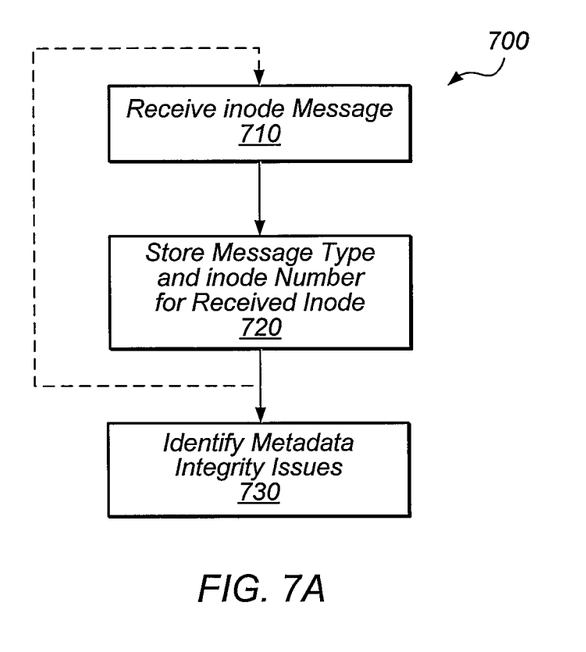
FIG. 7A is a flowchart of one embodiment of another method for performing verification of inode metadata.

Turning now to FIG. 7A, a flowchart of another method for verifying inode metadata is illustrated. In step 710, an inode message is received (e.g., at backup server 220). In step 720, the message type and inode number (or other identifying information) of the received message are stored (e.g., in a temporary data structure). For example, a record in an array might be created for each expected inode. An indication of the message type that caused the record to be created is recorded, along with any subsequent message type received for that inode. Method 700 can continue recording information as long as inode messages are received. In step 730, metadata integrity issues may then be identified. For example, it may be determined that incomplete metadata has been received for a particular inode.

Figure 7B:
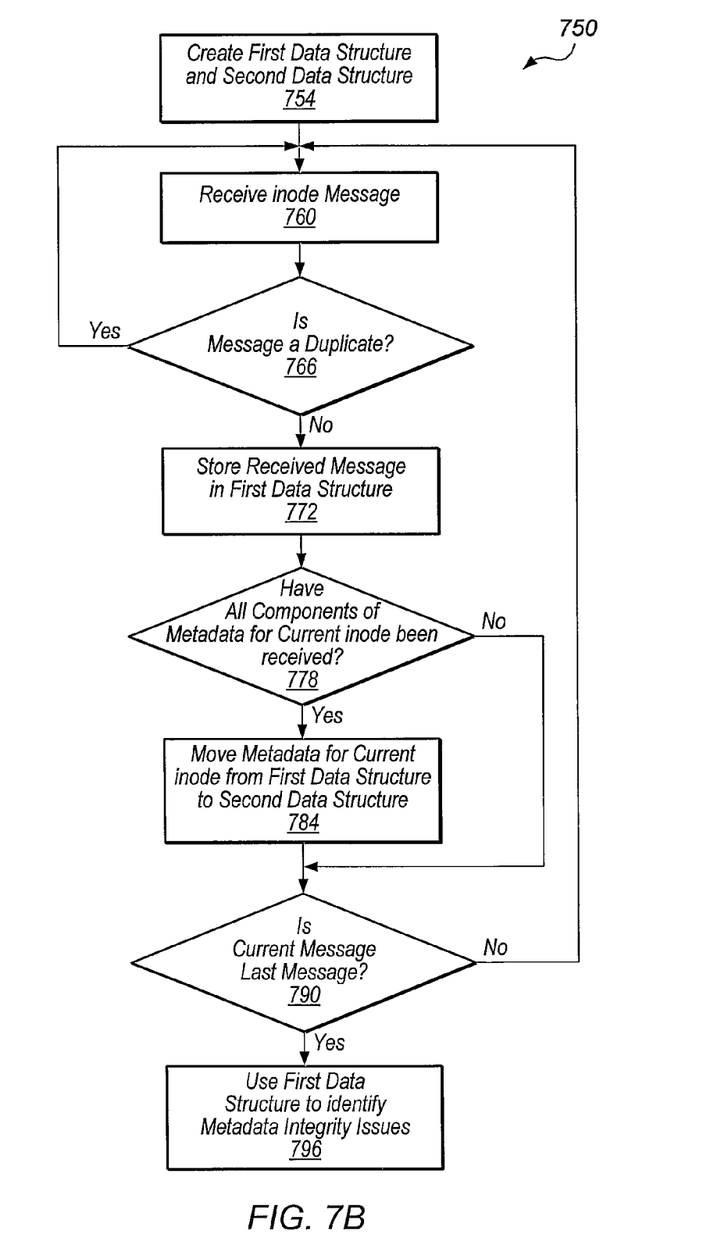
FIG. 7B is a flowchart of one embodiment of yet another method for performing verification of inode metadata.

Turning now to FIG. 7B, a flowchart of yet another embodiment for verifying metadata integrity is shown. Method 750 is similar to method 700 described above. In step 754, two data structures (which may be temporary) are created. In one embodiment, these data structures are organized as linked lists of records. For example, a record in the list may look like the inode structure shown in FIG. 1. Next, in step 760, an inode message is received (e.g., at backup server 220). In step 766, a determination is made whether the record is a duplicate. If so, processing returns to step 760; otherwise, method 750 proceeds to step 772, in which the metadata in the received message is stored within a corresponding record in the first data structure.

In step 778, a determination is made whether the metadata in the received messages "completes" the metadata for that inode. (For example, in one embodiment, if the name/parent message for a given inode has already been received, receipt of the data message would supply the remainder of the metadata for that inode.) If all of the metadata has been received for a given inode, the completed metadata is moved to the second data structure in step 784. Otherwise, method 750 continues with step 790 in which a determination is made whether there are further inode messages to process. If the last inode message has been received, any inodes having metadata remaining in the first data structure can be considered to have incomplete metadata. The information in the second data structure may either be discarded or may be retained (e.g., for further use in metadata processing as described below).

In some embodiments of method 700, it is not detected if no messages are received for a particular inode. Consider an inode that corresponds to a directory A, where directory A has a parent directory B. Even though all inode messages may be received for directory A, it may still be the case that no inode messages were received for directory B (pointed to by the name/parent inode message for directory A, in one embodiment). In such an instance, the catalog would include incomplete data.

Figure 8A:
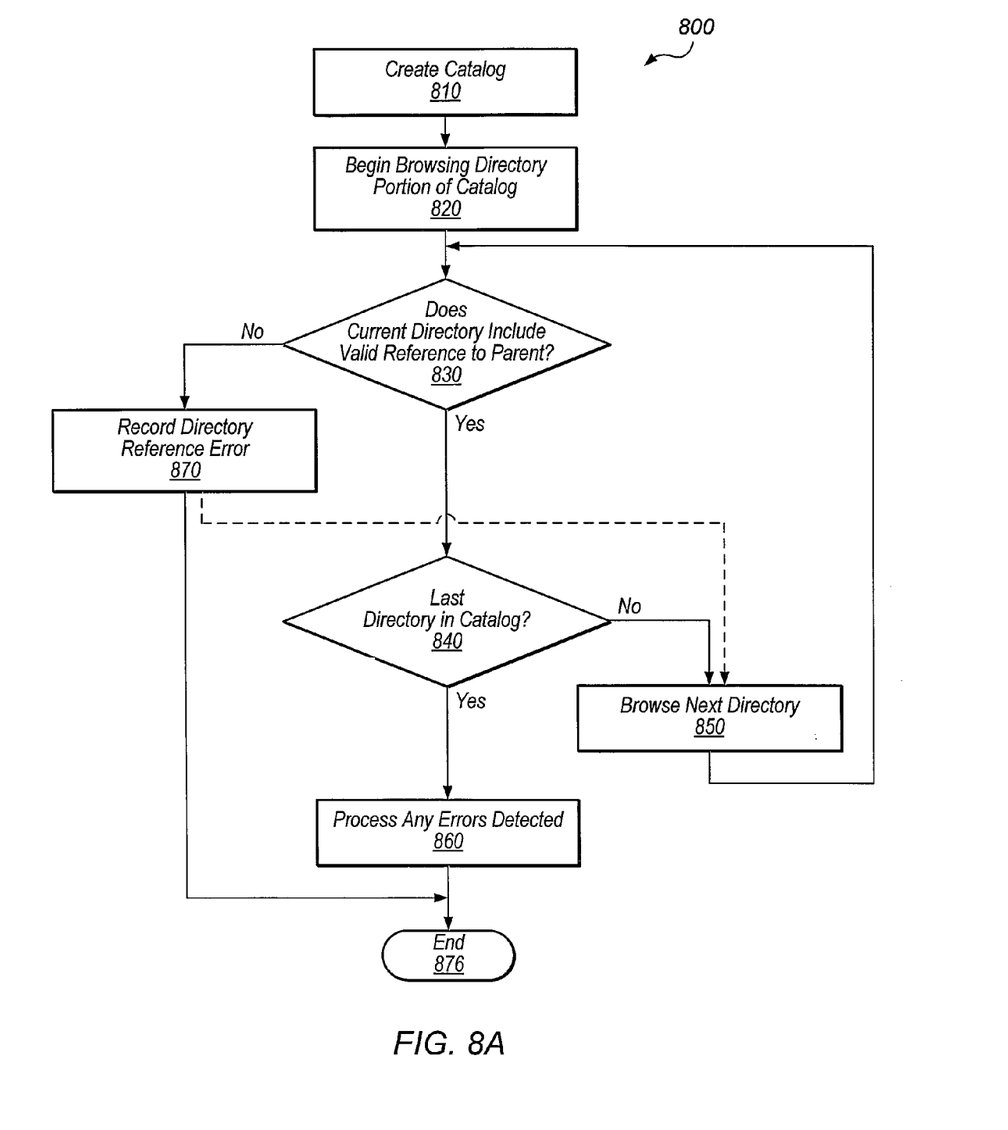
FIGS. 8A-B are flowcharts of still further embodiments of methods for performing verification of inode metadata.

Turning now to FIG. 8A, a flowchart of still another method for performing verification of inode metadata is illustrated. Method 800 begins with step 810, in which a catalog is created (e.g., on backup server 220). Step 810 may be performed, for example, upon receiving what is believed to be the set of all inode messages for a particular backup. For example, this point in time may be indicated by the receipt of a message indicating that a new "mount point" is being processed. Alternately, this point in time may be indicated by a request to "validate" or otherwise complete the backup. The catalog in step 810 includes metadata that corresponds to the data that is being backed up. In one embodiment, the catalog includes a "directory" portion and a "file" portion. Browsing the directory portion of such a catalog allows each directory to be analyzed in turn. This process is begun in step 820. In other embodiments, each file within the catalog may be browsed as well, which may be useful in determining errors in the data to be backed up.

In step 830, a determination is made whether the current directory includes a valid reference to its parent. In one embodiment, when a directory is created, its parent reference is initialized to a known invalid value. Accordingly, step 830 may include determining whether the parent reference still includes this invalid value. If so, step 840 determines whether the current directory is the last directory to be processed, with method 800 browsing to the next directory in step 850 and then returning to step 830. This loop continues until step 840 determines no more directories are to be processed.

If step 830 determines that the current directory does not include a valid parent reference, method 800 proceeds to step 870, in which the directory reference error is recorded. Step 870 may include reporting the error, aborting the backup, etc. As will be described below, step 870 may also include performing method 880 described below with reference to FIG. 8B. As shown by the dotted lines coming from step 870, method 800 may either end at step 876 or return to browse the next directory in step 850. When step 840 determines that the last directory in the catalog has been browsed, method 800 proceeds to step 860, in which any errors that have been recorded may be processed (e.g., reported) in step 860 before ending with step 876.

Figure 8B:
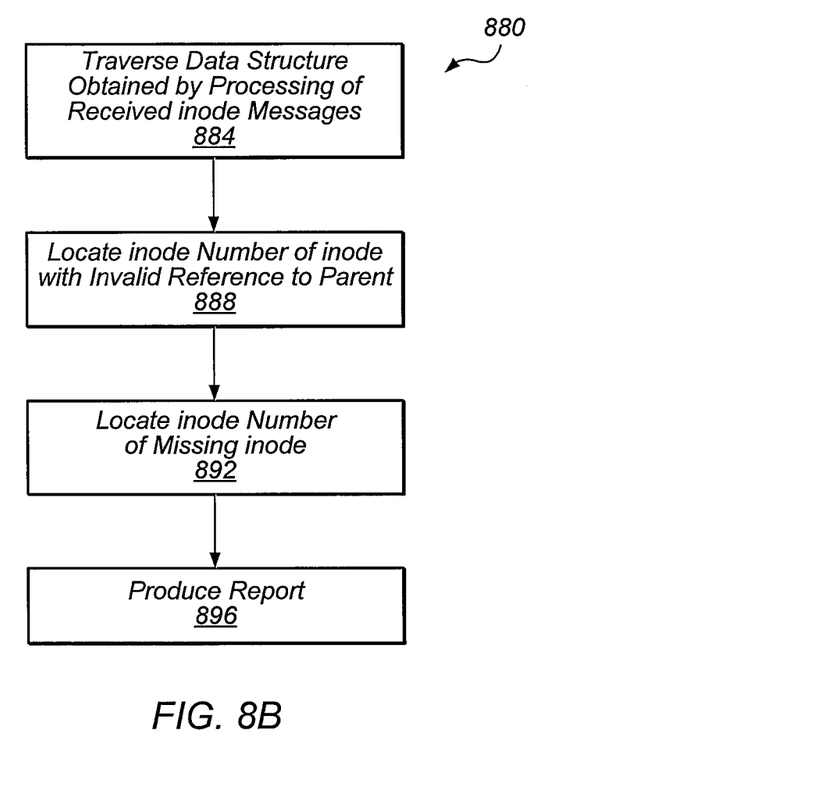

Turning now to FIG. 8B, a flowchart of a method for using stored inode metadata to provide information on a detected invalid parent directory is illustrated. In the context of method 800, it may be desirable to gather further information about invalid parent directory references that are detected. Method 880 is one embodiment of a method for gathering such information.

Method 880 begins at step 884, where it is presumed that an invalid parent directory reference has been detected (e.g., in a catalog as in method 800). In step 884, a previously created data structure may be traversed. This data structure may be a temporary data structure in some embodiments. The data structure accessed in step 884 may be a linked list, for example. One example of such an embodiment is the second data structure of method 700 described above. In step 888, the data structure is used to determine the inode number of the inode with the invalid parent directory reference. In step 892, the entry in the data structure that corresponds to the inode number determined in step 888 is used to determine the inode number of its parent directory, which is the missing inode. This information may then provided (e.g., in a report) in step 896.

Various embodiments may include storing instructions and/or data implemented in accordance with the foregoing description in a tangible computer-readable memory medium. Certain embodiments of these computer-readable memory media may include instructions and/or data that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc. The article of manufacture may also be a transmission medium.

Further embodiments may include signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable memory medium storing program instructions that are computer executable on a backup server to:
    receive a plurality of inode messages, wherein each of the received plurality of inode messages includes inode metadata for one of a plurality of inodes that is being backed up, wherein the plurality of received inode messages includes messages of a first type and messages of a second type, wherein, for a given inode being backed up, the first type of inode message includes name and parent information for the given inode, and wherein the second type of inode message includes additional metadata for the given inode; and
    use the received plurality of inode messages to determine whether the inode metadata includes errors by, excluding duplicative messages, determining whether an equal number of messages of the first type and messages of the second type are received by the backup server.

2. The non-transitory computer-readable memory medium of claim 1, wherein the program instructions are computer executable on the backup server to: increment a counter value for each received inode message of the first type; decrement the counter value for each received inode message of the second type; after receiving the plurality of inode messages, determine whether the current counter value has changed from an initial counter value set prior to receiving any of the plurality of inode messages.

3. The non-transitory computer-readable memory medium of claim 1, wherein the program instructions are usable to create and update a temporary data structure that includes inode metadata from the received plurality of inode messages.

4. The non-transitory computer-readable memory medium of claim 1, wherein the plurality of inode messages are received via an NDMP connection.

5. The non-transitory computer-readable memory medium of claim 1, wherein determining whether the inode metadata includes errors includes determining whether the inode metadata is incomplete or determining whether the inode metadata includes an invalid reference.

6. A non-transitory computer-readable memory medium storing program instructions that are computer executable to:
    create or update a backup catalog associated with data backed up from a first server using an inode-based backup;
    traverse at least a directory portion of the backup catalog to determine whether metadata associated with each of a plurality of directories listed in the backup catalog includes a valid reference to a parent directory of that directory;
    in response to detecting that metadata for a first of the plurality of directories includes an invalid reference to a parent directory, determine an inode on the first server corresponding to the parent directory of the first directory; and
    provide a report that includes the determined inode corresponding to the parent directory of the first directory.

7. The non-transitory computer-readable memory medium of claim 6, wherein the program instructions are computer executable to:
    receive a plurality of inode messages from the first server, wherein each of the received inode messages includes inode metadata for one of a plurality of inodes that is located on the first server and is being backed up to the backup server; and
    use the received plurality of inode messages to create or update the backup catalog.

8. The non-transitory computer-readable memory medium of claim 7, wherein the plurality of inode messages are received via an NDMP connection.

9. A backup server, comprising:
    a processor unit including one or more processors;
    a memory subsystem storing program instructions executable by the processor unit to:
        receive a plurality of inode messages from a first server coupled to the backup server, wherein each of the received plurality of inode messages includes inode metadata for one of a plurality of inodes that is located on the first server and is being backed up to the backup server, wherein the plurality of received inode messages includes messages of a first type and messages of a second type, wherein, for a given inode being backed up, the first type of inode message includes name and parent information for the given inode, and wherein the second type of inode message includes additional metadata for the given inode; and use the received plurality of inode messages to determine whether the inode metadata includes errors by determining, for each of the plurality of inodes, whether the received plurality of inode messages includes at least one message of the first type and at least one message of the second type.

10. The backup server of claim 9, wherein the plurality of inode messages are received via an NDMP connection.

11. The backup server of claim 9, wherein the memory subsystem stores program instructions that are executable by the processor unit to:

upon receiving an initial message for a given inode, store metadata included in the initial message in a first data structure;

upon determining that at least one inode message of the first type and at least one inode message of the second type have been received for the given inode, move metadata for the given inode from the first data structure into a second data structure; and upon receiving all of the plurality of inode messages, identify inodes with information remaining in the first data structure as having incomplete metadata.

12. The backup server of claim 11, wherein the memory subsystem stores program instructions that are executable by the processor unit to:

use the second data structure to update a catalog, wherein the catalog is usable to restore the plurality of inodes.

13. The backup server of claim 9, wherein the memory subsystem stores program instructions that are executable by the processor unit to:

create or update a catalog using the received plurality of inode messages;

for a given directory listed in the catalog that is not determined to have a valid parent directory reference, determine an inode on the first server that corresponds to the actual parent of the given directory.

* * * * *